United States Patent
Cismas

(10) Patent No.: US 10,390,010 B1
(45) Date of Patent: Aug. 20, 2019

(54) VIDEO CODING REORDER BUFFER SYSTEMS AND METHODS

(71) Applicant: OVICS, Saratoga, CA (US)

(72) Inventor: Sorin C. Cismas, Saratoga, CA (US)

(73) Assignee: oViCs, Saratoga, CA (US)

( * ) Notice: Subject to any disclaimer, the term of this patent is extended or adjusted under 35 U.S.C. 154(b) by 746 days.

(21) Appl. No.: 14/303,557

(22) Filed: Jun. 12, 2014

Related U.S. Application Data

(60) Provisional application No. 61/834,040, filed on Jun. 12, 2013.

(51) Int. Cl.
*H04N 11/02* (2006.01)
*H04N 19/152* (2014.01)
*H04N 19/44* (2014.01)
*H04N 19/124* (2014.01)

(52) U.S. Cl.
CPC ... *H04N 19/00193* (2013.01); *H04N 19/0009* (2013.01); *H04N 19/00533* (2013.01)

(58) Field of Classification Search
CPC .... G06F 9/30032; G06F 5/06; G06F 13/1626; G06F 9/30036; G06F 5/085; H04N 7/50; H04N 7/26244; H04N 5/145; H04N 19/00193; H04N 19/0009; H04N 19/00533
USPC .......... 375/240.16, 240.24; 365/221; 710/36; 711/105, E12.075, 100; 712/1; 382/251, 382/238
See application file for complete search history.

(56) References Cited

U.S. PATENT DOCUMENTS

| | | | | |
|---|---|---|---|---|
| 5,649,225 A | * | 7/1997 | White | G06F 9/30032 712/1 |
| 6,237,082 B1 | * | 5/2001 | Witt | G06F 9/30036 711/E12.075 |
| 6,278,838 B1 | | 8/2001 | Mendenhall et al. | |
| 6,476,793 B1 | * | 11/2002 | Motoyama | H04N 1/62 345/589 |
| 6,594,714 B1 | * | 7/2003 | Swanson | G06F 5/06 710/36 |
| 7,103,100 B1 | | 9/2006 | Tsukagoshi et al. | |
| 7,533,237 B1 | * | 5/2009 | Nordquist | G06F 12/0284 711/100 |
| 2003/0217224 A1 | * | 11/2003 | Watts | G06F 13/1626 711/105 |
| 2006/0023541 A1 | * | 2/2006 | Sapre | G06F 5/085 365/221 |
| 2007/0133891 A1 | * | 6/2007 | Jeong | H04N 19/176 382/238 |
| 2007/0195888 A1 | * | 8/2007 | Sabeti | H04N 19/176 375/240.24 |
| 2011/0280312 A1 | | 11/2011 | Gaur et al. | |
| 2013/0155086 A1 | | 6/2013 | Sartain et al. | |

* cited by examiner

*Primary Examiner* — Jayanti K Patel
*Assistant Examiner* — Richard B Carter
(74) *Attorney, Agent, or Firm* — Meyertons, Hood, Kivlin, Kowert & Goetzel, P.C.

(57) ABSTRACT

In some embodiments, distributed video reorder buffers of a video (e.g. HEVC, H.265) encoder/decoder each include a circular FIFO array of pointers to buffer allocation units, and control logic which assigns allocation units to incoming video data in an order that allocation units are released by outgoing video data. The assignment order allows increased buffer utilization and lower buffer sizes, which is of increased importance for relatively large (e.g. 64×64, 32×32) video blocks, as supported by HEVC encoding/decoding.

26 Claims, 10 Drawing Sheets

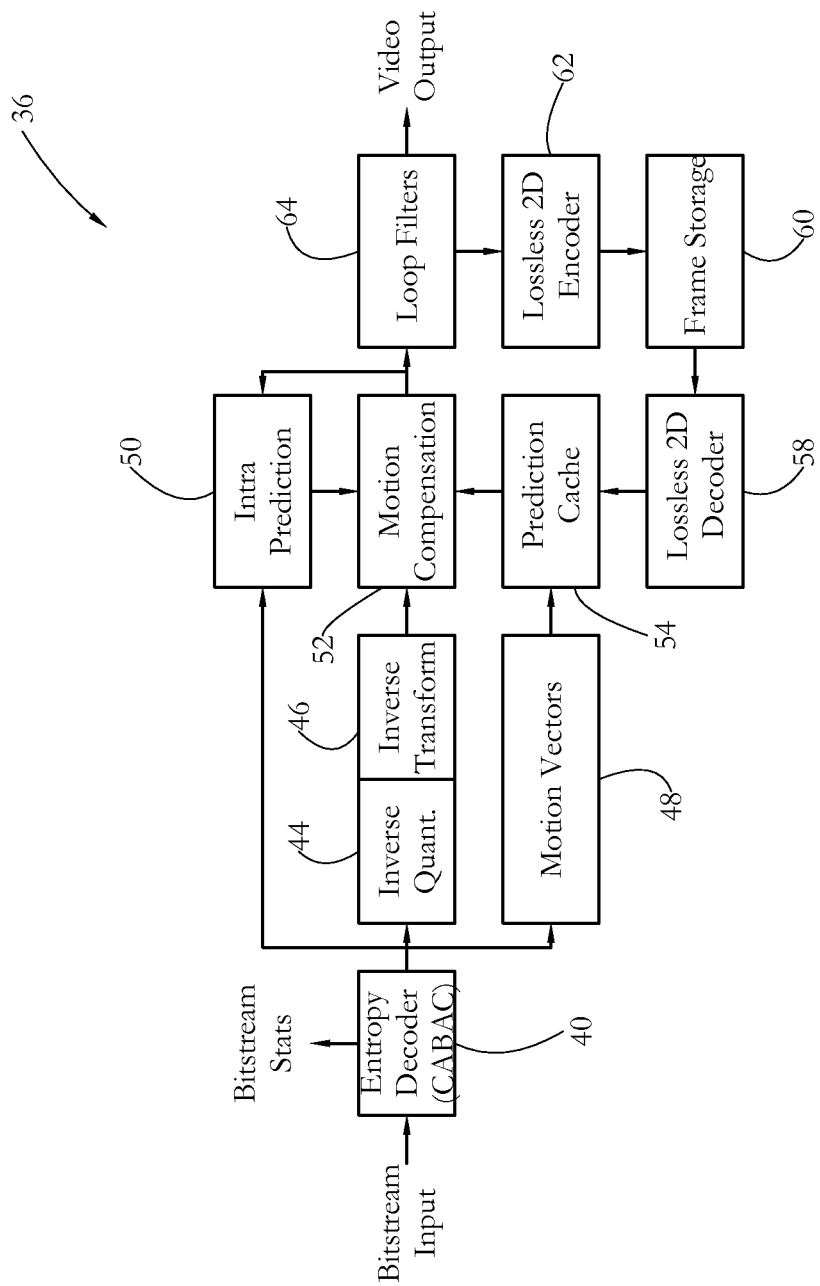
FIG. 2-A

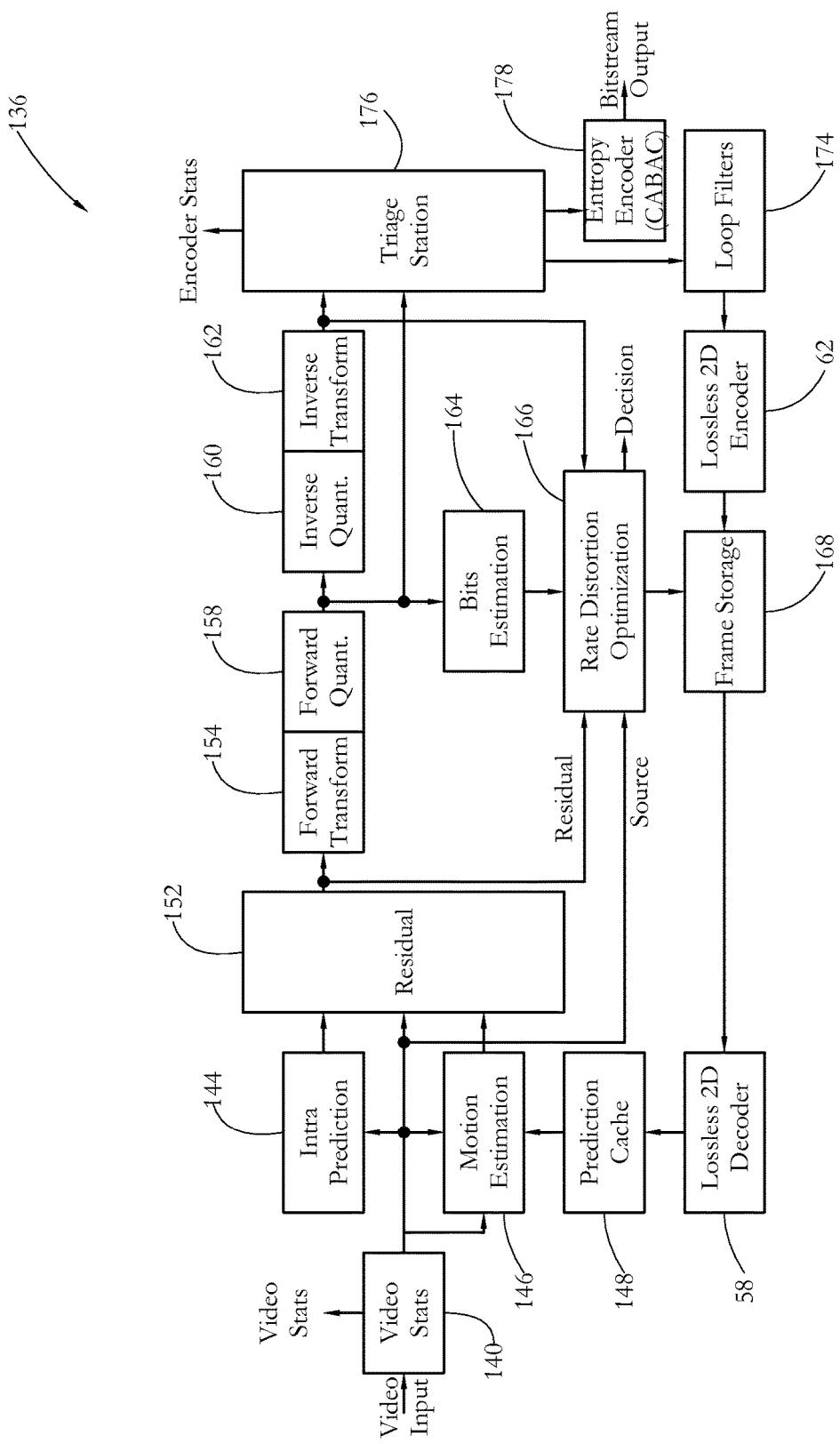
FIG. 2-B

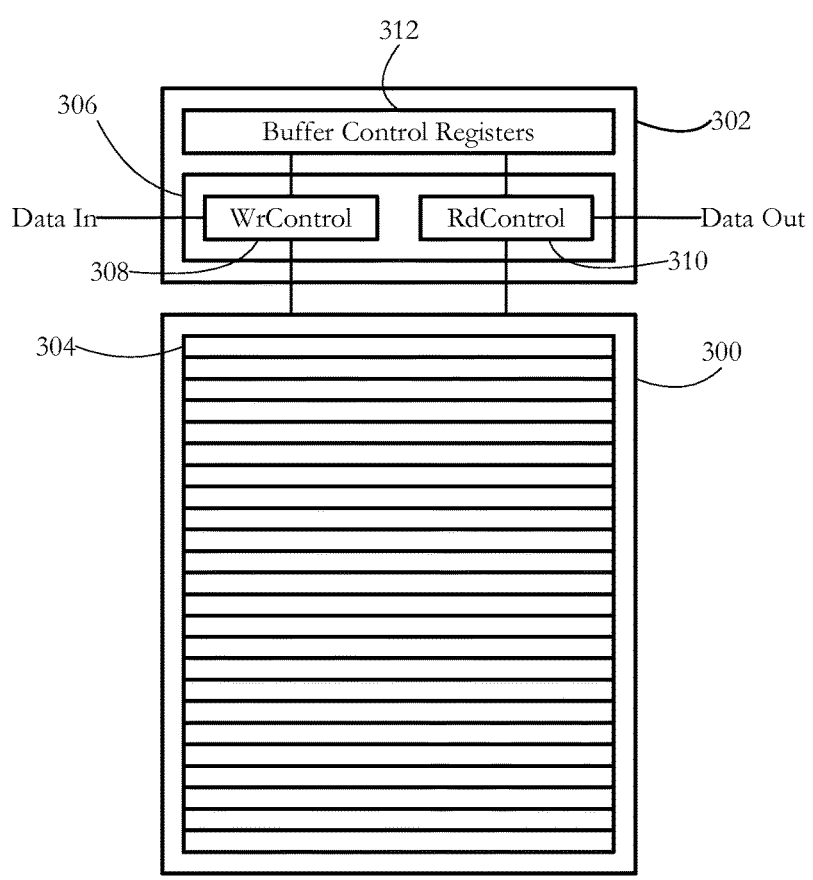
FIG. 5-A

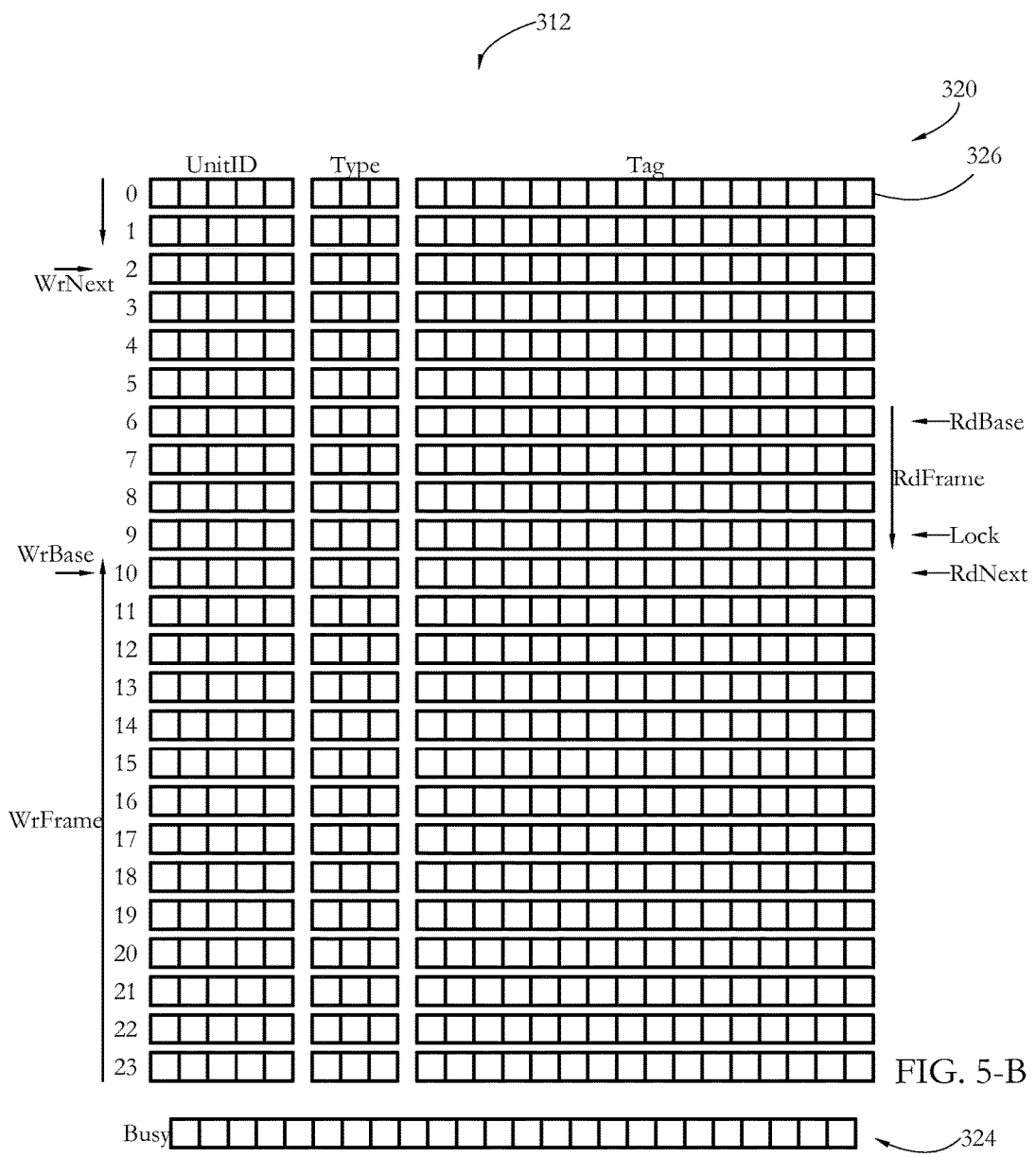
FIG. 5-B

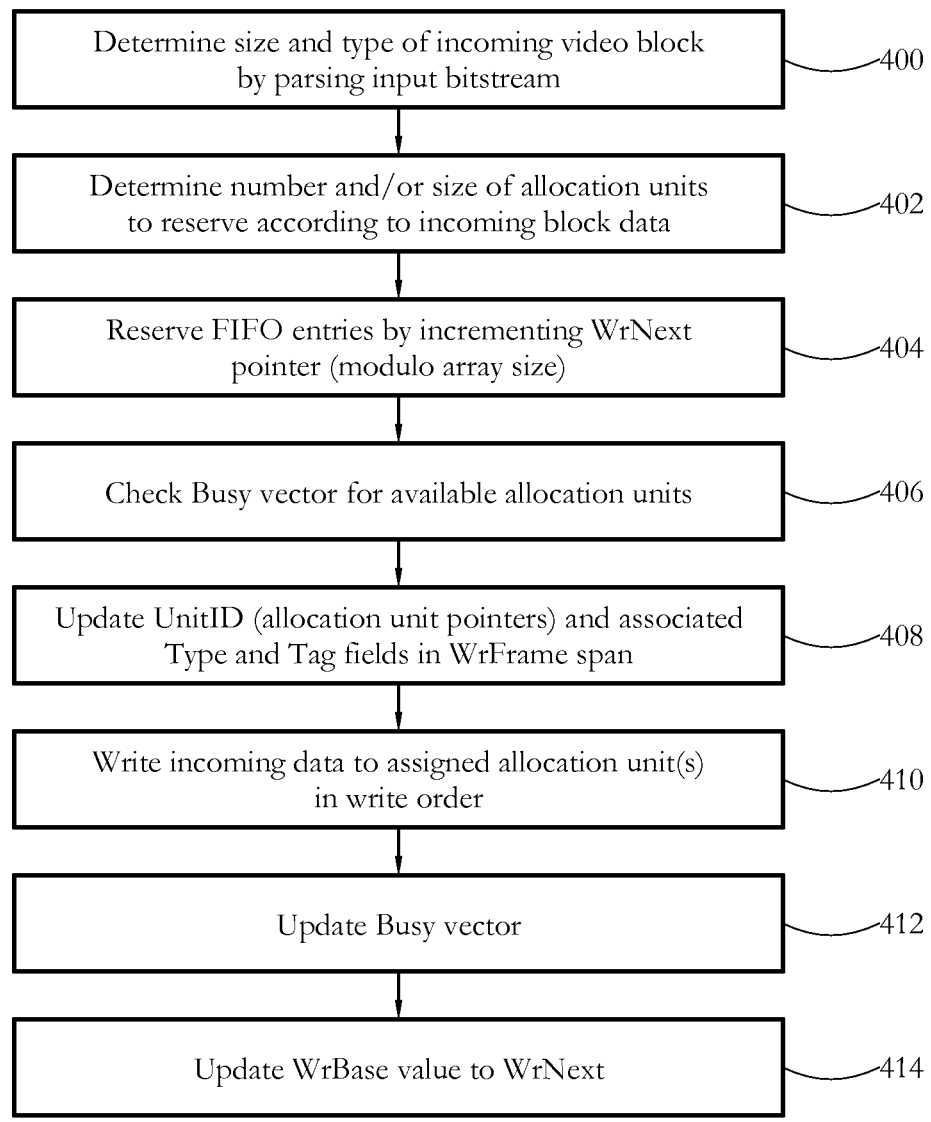
FIG. 6-A

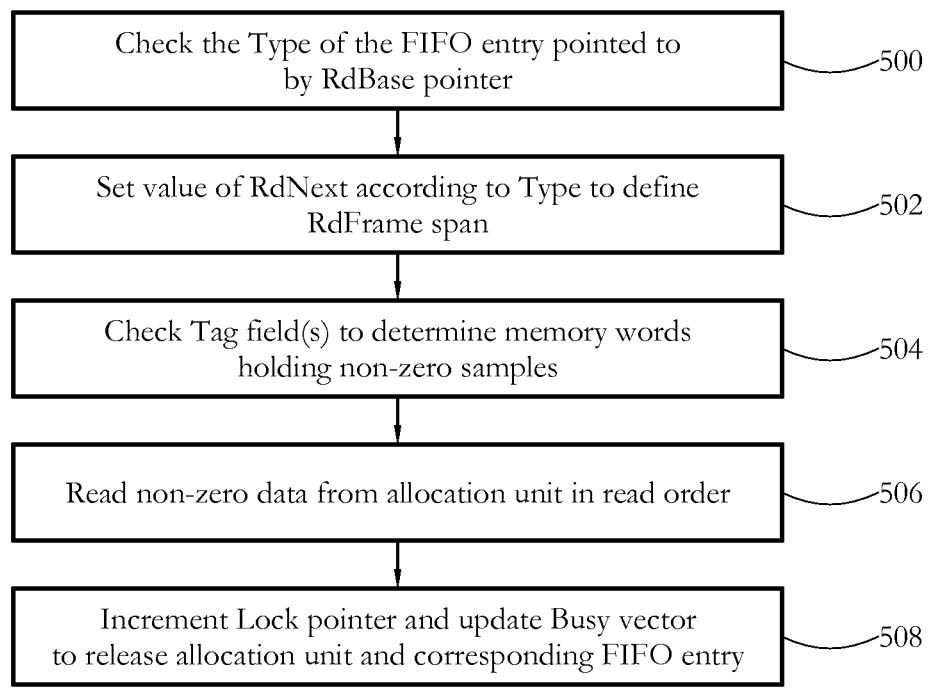
FIG. 6-B

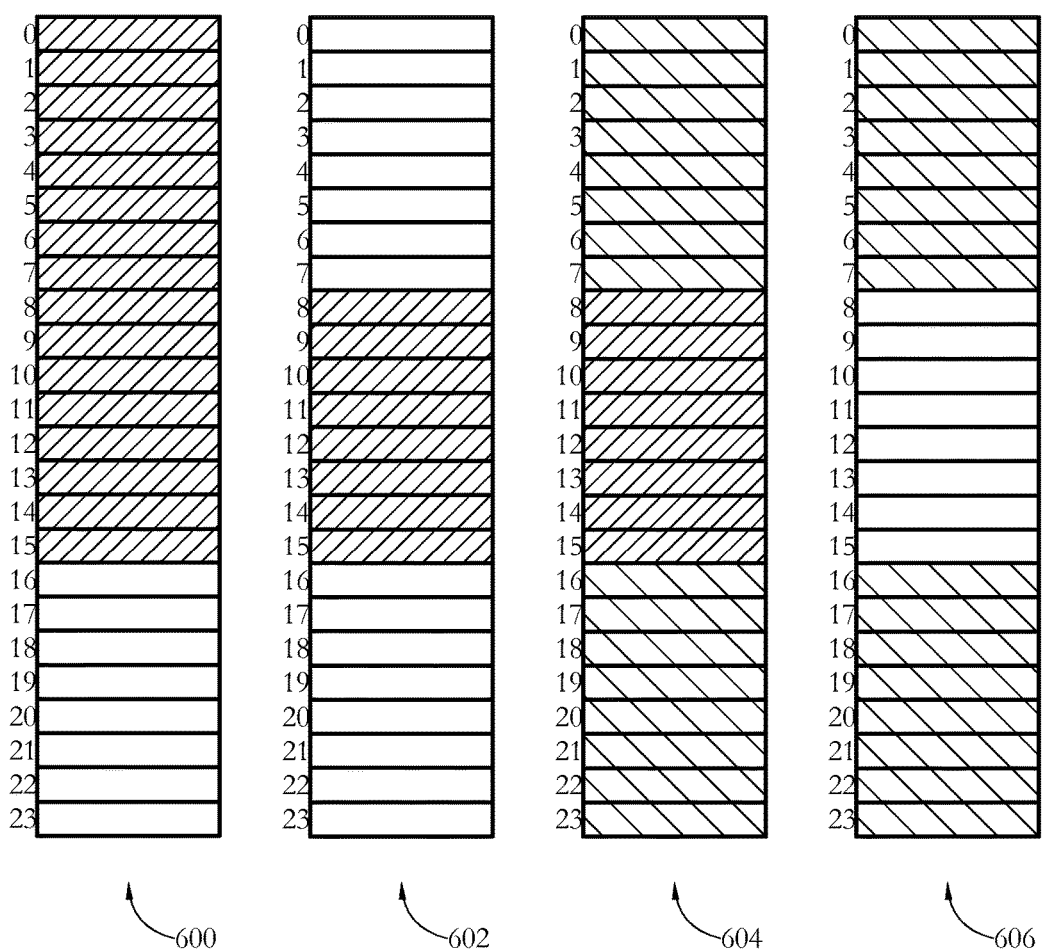
FIG. 6-C

VIDEO CODING REORDER BUFFER SYSTEMS AND METHODS

RELATED APPLICATION DATA

This application claims the benefit of the filing date of U.S. Provisional Patent Application No. 61/834,040, filed Jun. 12, 2013, which is herein incorporated by reference.

BACKGROUND OF THE INVENTION

The invention relates to video data processing, an in particular to video encoding and decoding systems and methods including video reorder buffers.

Video processing, be it video compression, video decompression, or image processing in general, makes use of large amounts of data which are typically organized in video frames (pictures). Video processing generally requires significant computational resources and memory bandwidth. The computational burden and associated memory bandwidth and power requirements of video processing can be particularly challenging in mobile, battery-operated devices, which are subject to stringent power consumption constraints. In particular, using higher clock frequencies to improve performance may lead to higher power consumption, which may be particularly undesirable in mobile devices. As video resolutions increase to 4 k and beyond, performing video processing in real time, particularly on mobile devices, can pose new challenges.

SUMMARY OF THE INVENTION

According to one aspect, an integrated circuit comprises: a video data reorder buffer forming part of the integrated circuit and connected to video coding logic forming part of the integrated circuit, the video data reorder buffer being configured to store video data blocks to be processed by the video coding logic; and a video data reorder buffer controller forming part of the integrated circuit, connected to the video data reorder buffer and configured to control storing and retrieving video data blocks to/from the video data reorder buffer. The video data reorder buffer controller comprises a first-in-first-out (FIFO) array of registers storing a plurality of video data reorder buffer control FIFO entries, each FIFO entry comprising an allocation unit pointer, the allocation unit pointer being a pointer to an allocation unit of the video data reorder buffer, the allocation unit storing multiple words, and FIFO control logic connected to the FIFO array of registers and configured to assign allocation units to incoming video data received by the video data reorder buffer according to an order of allocation units released by outgoing video data output by the video data reorder buffer.

According to another aspect, a video coding method comprises: storing video data blocks in a video data reorder buffer forming part of the integrated circuit and connected to video coding logic forming part of the integrated circuit, for processing by the video coding logic; and using a video data reorder buffer controller forming part of the integrated circuit to control storing and retrieving video data blocks to/from the video data reorder buffer. The video data reorder buffer controller comprises a first-in-first-out (FIFO) array of registers storing a plurality of video data reorder buffer control FIFO entries, each FIFO entry comprising an allocation unit pointer, the allocation unit pointer being a pointer to an allocation unit of the video data reorder buffer, and FIFO control logic connected to the FIFO array of registers and configured to assign allocation units to incoming video data received by the video data reorder buffer according to an order of allocation units released by outgoing video data output by the video data reorder buffer.

According to another aspect, an integrated circuit comprises: a video data reorder buffer forming part of the integrated circuit and configured to store video data to be processed by video coding logic; and a video data reorder buffer controller forming part of the integrated circuit, connected to the video data reorder buffer and configured to control storing and retrieving data to/from the video data reorder buffer. The video data reorder buffer controller comprises an array of registers storing a plurality of video data reorder buffer control entries, each entry comprising an allocation unit pointer, the allocation unit pointer being a pointer to an allocation unit of the video data reorder buffer, the allocation unit storing multiple words, and control logic connected to the array of registers and configured to assign allocation units to incoming video data received by the video data reorder buffer according to an order of allocation units released by outgoing video data output by the video data reorder buffer.

BRIEF DESCRIPTION OF THE DRAWINGS

The foregoing aspects and advantages of the present invention will become better understood upon reading the following detailed description and upon reference to the drawings where:

FIG. 2-A shows an exemplary video image decoder having processing blocks including or connected to video reorder buffers according to some embodiments of the present invention.

FIG. 2-B shows an exemplary video image encoder having processing blocks including or connected to video reorder buffers according to some embodiments of the present invention.

FIG. 5-A illustrates an exemplary video data reorder buffer and associated buffer controller according to some embodiments of the present invention.

FIG. 5-B shows an exemplary set of reorder buffer control registers and associated fields according to some embodiments of the present invention.

FIG. 6-A shows an exemplary a sequence of steps performed by a video coding system during a reorder buffer write operation according to some embodiments of the present invention.

FIG. 6-B shows an exemplary a sequence of steps performed by a video coding system during a reorder buffer read operation according to some embodiments of the present invention.

FIG. 6-C illustrates a sequence of write, read, and write operations performed for 2 data blocks according to some embodiments of the present invention.

DETAILED DESCRIPTION OF THE INVENTION

The following description illustrates the present invention by way of example and not necessarily by way of limitation.

Any reference to an element is understood to refer to at least one element. A set of elements is understood to include one or more elements. A plurality of elements includes at least two elements, and multiple elements refers to at least two elements. Unless otherwise specified, each recited element or structure can be formed by or be part of a single structure or unit, or be formed from multiple distinct structures or units. Unless otherwise specified, any recited connections can be direct connections or indirect operative connections established through intermediary circuit elements or structures. The statement that two or more events or actions happen synchronously is understood to mean that the events/actions happen on the same clock cycle. Unless otherwise specified, the term "access" is used below to encompass read and write transactions; in the context of a read transaction, accessing data refers to reading data, while in the context of a write transaction, accessing data refers to writing data. Unless otherwise specified, the term "coding" refers to encoding and/or decoding. Video data includes pixel-domain as well as frequency-domain video data (e.g. frequency-domain residual data), as well as associated data such as motion compensation/estimation data (e.g. motion vectors), quantization data, and other video encoding/decoding parameters. Computer readable media encompass non-transitory (storage) media such as magnetic, optic, and semiconductor media (e.g. hard drives, optical disks, flash memory, DRAM), as well as communications links such as conductive cables and fiber optic links. According to some embodiments, the present invention provides, inter alia, computer systems including at least one processor and/or memory programmed to perform the methods described herein, as well as computer-readable media encoding instructions to perform the methods described herein.

Figure 1:
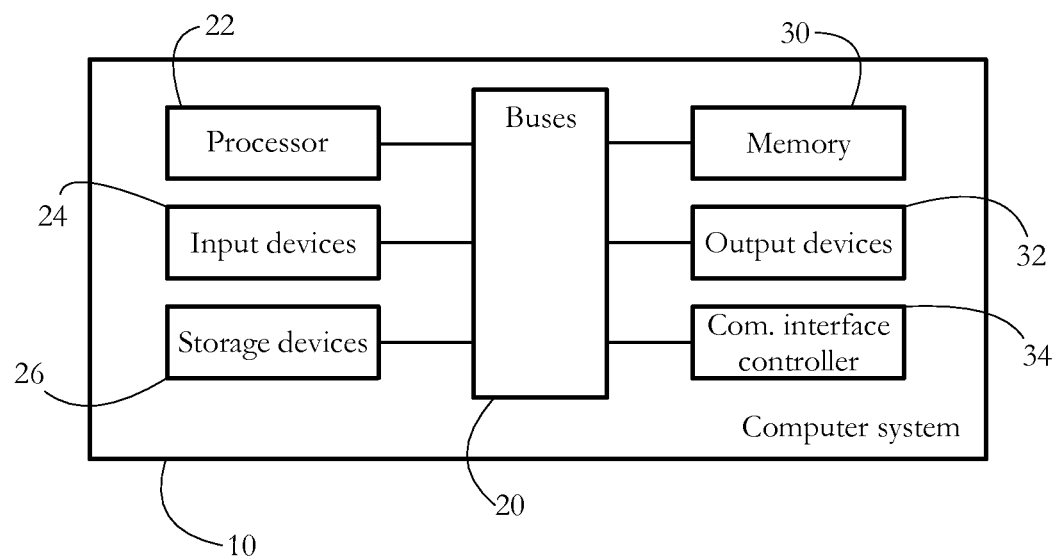
FIG. 1 shows an exemplary video coding (encoding and/or decoding) system including a video prediction cache, according to some embodiments of the present invention.

FIG. 1 shows an exemplary data processing system 10 according to some embodiments of the present invention. One or more buses 20 connect a microprocessor (CPU) 22, memory (e.g. DRAM) 30, input devices (e.g. mouse, keyboard) 24, output devices (e.g. display, speakers, haptic/vibration generator) 32, storage devices (e.g. hard drive, solid state drive) 26, and a communication interface controller (e.g. network interface card) 34. The illustrated computer system 10 may be a server, personal computer, tablet, or mobile communication device (e.g. smartphone) capable of performing video coding (encoding and/or decoding) operations.

Microprocessor 22 may be a general-purpose processor (e.g. a multi-core processor) integrated on a semiconductor substrate and running software implementing a number of system and/or method components as described below. In some embodiments, microprocessor 22 may include dedicated special-purpose hardware units (e.g. cores) implementing in hardware at least some of the system and/or method components described below. In particular, in some embodiments, hardware-implemented video encoders and/or decoders form part of microprocessor 22.

FIGS. 2-A shows an exemplary video image decoder 36, while FIG. 2-B shows an exemplary video image encoder 136 according to some embodiments of the present invention. In some embodiments, at least some of the components shown in FIGS. 2-A and 2-B may be implemented using software running on a general-purpose processor, while at least some components, and in particular the video reorder buffer controllers described below, may be implemented as special-purpose hardware units.

As shown in FIG. 2-A, decoder 36 includes a number of decoder units connected between a video input and a corresponding bitstream output: an entropy decoder (CABAC) unit 40, an inverse quantization unit 44, an inverse transform unit 46, a motion vector unit 48, an intra prediction unit 50, a motion compensation unit 52, a prediction cache 54, a lossless 2D decoder unit 58, a frame storage unit 60, a lossless 2D encoder unit 62, and a loop filter unit 64. Decoder 36 receives a compressed standard-compliant byte-stream and outputs pictures in raster order.

As shown in FIG. 2-B, encoder 136 includes a number of encoder units connected between a video input and bitstream output: a video statistics generation unit 140, an intra prediction unit 144, a motion estimation unit 146, a prediction cache 148, a lossless 2D decoder unit 58, a residual determination unit 152, a forward transform unit 154, a forward quantization unit 158, an inverse quantization unit 160, an inverse transform unit 162, a bits estimation unit 164, a rate-distortion optimization unit 166, a frame storage unit 168, a lossless 2D encoder unit 62, a loop filter unit 174, a triage station unit 176, and an entropy encoder (CABAC) unit 178. In some embodiments, frame storage units 60, 168 may be provided off-die, in external memory. In some embodiments, frame storage units 60, 168 are included on-die (on the same semiconductor substrate) with the other components shown in FIGS. 2-A-B. Encoder 136 receives picture data in raster order and outputs a compressed standard-compliant byte-stream. Decoder 36 and/or encoder 136 perform video coding operations according to one or more video coding standards such as MPEG-2, H.264 (MPEG 4 AVC), and/or H.265 (HEVC, or High Efficiency Video Coding). Compared to H.264, HEVC may allow increased compression rates at the same level of quality, or alternatively provide improved video quality at the same bit rate, but generally requires increased computational and memory bandwidth resources.

Figure 3:
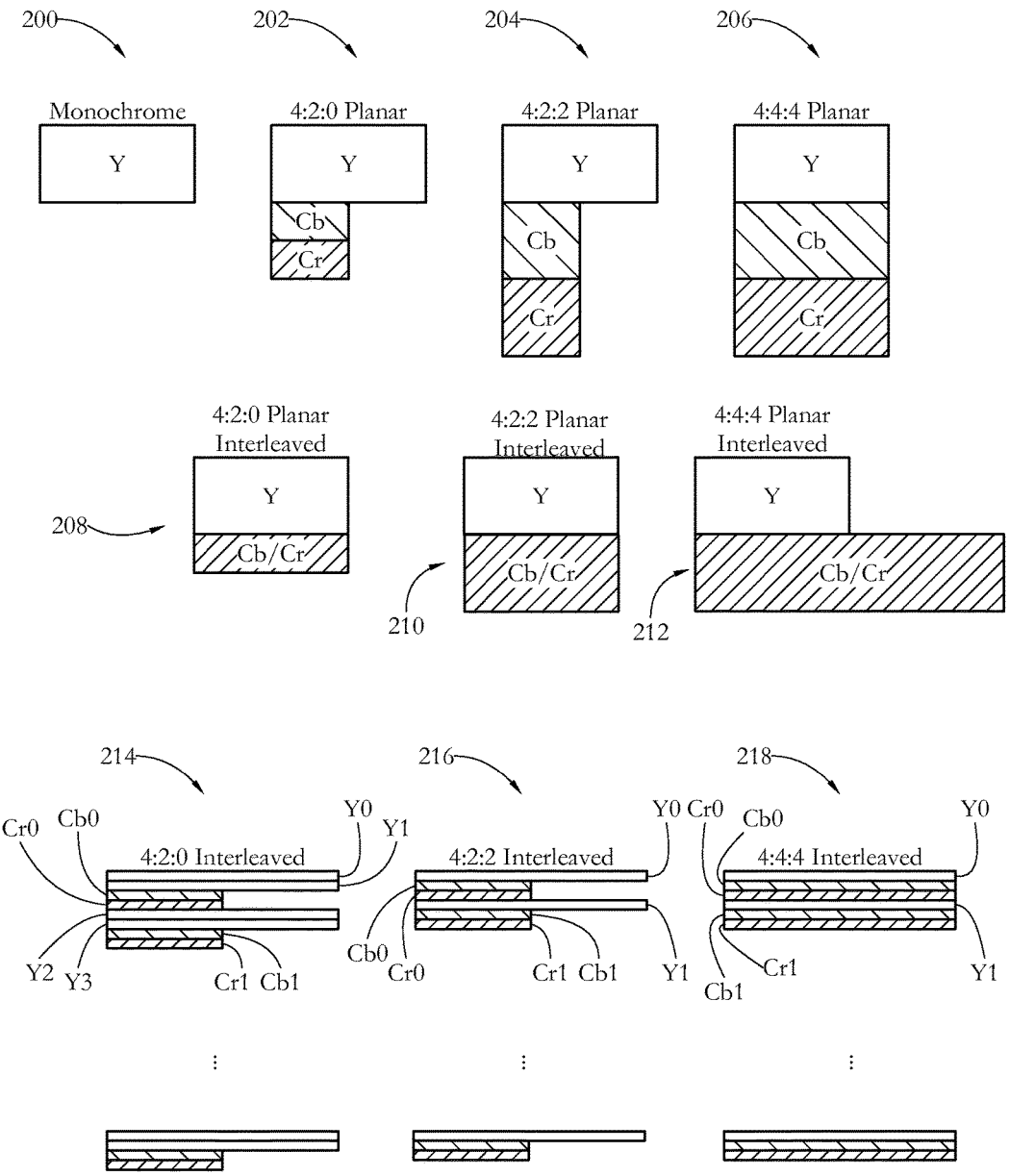
FIG. 3 shows a number of exemplary pixel sequences for different picture formats according to some embodiments of the present invention.

In some embodiments, decoder 36 and encoder 136 support multiple picture formats, including monochrome, 4:2:0, 4:2:2, and 4:4:4 chroma formats, planar, interleaved, and planar interleaved. FIG. 3 illustrates a number of exemplary pixel sequences: a monochrome sequence 200, a 4:2:0 planar sequence 202, a 4:2:2 planar sequence 204, a 4:4:4 planar sequence 406, a 4:2:0 planar interleaved sequence 208, a 4:2:2 planar interleaved sequence 210, a 4:4:4 planar interleaved sequence 212, a 4:2:0 interleaved sequence 214, a 4:2:2 interleaved sequence 216, and a 4:4:4 interleaved sequence 218. In FIG. 3, Y denotes luminance (luma), while Cb and Cr denote blue-difference and red-difference chrominance (chroma) components, respectively. In the planar interleaved sequences 208-212, Cb and Cr are interleaved at the byte level.

In some embodiments, one or more of the encoder and/or decoder units shown in FIGS. 2-A-B include a video data reorder buffer and associated buffer controller, as described below. Such reorder buffers may be provided as part of or in operative connection with a number of video decoder and/or encoder blocks, including quantization (forward and inverse), transform (forward and inverse), motion compensation/estimation, loop filter, intra/inter prediction, and entropy coding blocks. In some embodiments, each reorder buffer stores only one of monochrome, luma and chroma data. In some embodiments, a reorder buffer may store both luma and chroma data of a video block.

Figure 4:
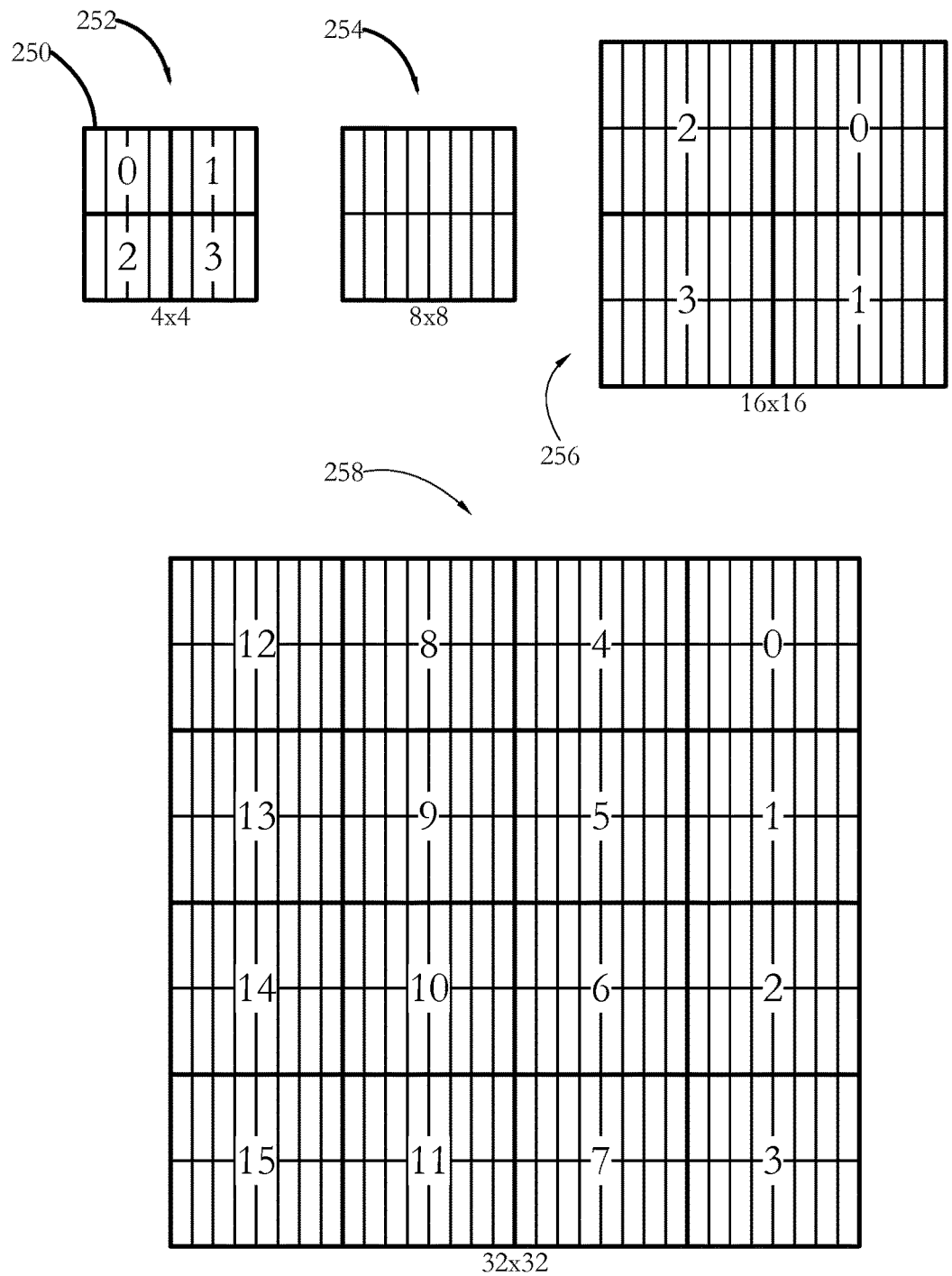
FIG. 4 illustrates an exemplary ordering of blocks and allocation units for an allocation unit size of 8×8 and various video block sizes, according to some embodiments of the present invention.

In some embodiments, a video data reorder buffer is organized as a plurality of allocation units. Each allocation unit is capable of storing a 2D array of video data. In some embodiments, each allocation unit is sized to store the data of an 8×8 video block. FIG. 4 illustrates an exemplary ordering of blocks and associated allocation units for an allocation unit size of 8×8 and various video block sizes, according to some embodiments of the present invention. Such an allocation unit can store the data of a 2×2 array of 4×4 video blocks, as illustrated by the 2×2 array 252 in FIG. 4, or of an 8×8 video block, as illustrated by video block 254 in FIG. 4. A 16×16 block 256 is stored in four 8×8 allocation units numbered 0-3 in FIG. 4, while a 32×32 block 258 is stored in sixteen 8×8 allocation units numbered 0-15 in FIG. 4. The numbering shown within blocks 256 and 258 may be relative to a write base index, described below.

FIG. 5-A illustrates an exemplary reorder buffer 300 and associated buffer controller 302 according to some embodiments of the present invention. Buffer 300 may be implemented as on-chip static random access memory (SRAM). Buffer 300 comprises a plurality of allocations unit 304. In the embodiment illustrated in FIG. 5-A, buffer 300 includes 24 allocation units 304. Buffer controller 302 includes special-purpose hardware control logic 306 comprising write control logic 308 and read control logic 310 controlling writing and reading data to/from buffer 300, and a set of buffer control registers 312 connected to control logic 306, for storing a number of allocation unit pointers and other buffer control parameters as described below.

FIG. 5-B shows an exemplary set of reorder buffer control registers 312 and associated fields according to some embodiments of the present invention. Registers 312 include a circular first-in-first-out (FIFO) array of registers 320, and one or more busy registers 324. Busy register(s) 324 store one bit for each allocation unit, indicating whether the corresponding allocation unit is full (busy) or empty. FIFO array 320 includes one register for each corresponding allocation unit, each storing a corresponding video data reorder buffer control FIFO entry 326. In the exemplary embodiment shown in FIG. 5-B, FIFO array 320 includes twenty-four registers. Each FIFO entry 326 includes a pointer to an allocation unit (an address or other identifier of the allocation unit), shown in FIG. 5-B as a five-bit field UnitID. The allocation unit pointer UnitID may have a value between 0 and 23, which may be used as the most significant 5-bits of each memory address. Each FIFO entry 326 further comprises a type field Type indicating at least one parameter for video data stored in the allocation unit identified by the corresponding allocation unit pointer. The type field describes the content of the corresponding allocation unit. The type parameter(s) may include one or more of an identifier of an intra or inter type of video data, an identifier of a luma or chroma type of video data, and/or a video data block size. The type parameter(s) may be specific to the data and the processing unit that uses the data. In an exemplary embodiment, for example for a buffer whose data is processed by a quantization unit, the type parameter indicates a type selected from 4×4 intra luma, 4×4 inter luma or chroma, 8×8, 16×16, and 32×32. Other buffers may use other data types, or none at all. Each FIFO entry 326 further includes a tag field Tag comprising a bitmap indicating a set of memory words containing non-zero samples in the allocation unit identified by the corresponding allocation unit pointer. The type and tag fields, if present, may be used by video coding logic that processes data output by reorder buffer 300.

Buffer controller 302 controls the storing and retrieval of video data to/from reorder buffer 300. In particular, buffer controller 302 assigns allocation units to incoming video data received by the video data reorder buffer according to an order of allocation units released by outgoing video data output by the video data reorder buffer. In some embodiments, to control the release and assignment of allocation units and associated FIFO entries, buffer controller 302 maintains a number of 5-bit control pointers illustrated in FIG. 5-B: a write base pointer WrBase, a write next pointer WrNext, a read base pointer RdBase, a read next pointer RdNext, and a lock pointer Lock. In some embodiments, each control pointer has a value from 0 to 23, with values wrapping around to zero upon incrementing after 23. In particular, FIG. 5-B illustrates the assignment of sixteen allocation units, marked WrFrame, to an incoming video data block. The write base pointer WrBase points to the first FIFO entry of the current (incoming) block of data to be written. The write next pointer WrNext is set to point to the allocation unit following the last allocation unit taken up by the current write operation. The read base pointer RdBase points to the first FIFO entry of the current (outgoing) block of data to be read and output. The read next pointer RdNext points to the allocation unit following the last allocation unit to be read in the current read operation. FIG. 5-B illustrates the reading (and release) of four allocation units, marked RdFrame, corresponding to an outgoing video data block. The lock pointer Lock points to the FIFO entry corresponding to the current allocation unit being read; the lock pointer is incremented after the data of a current allocation unit has been read entirely, to release the FIFO entry for future use. The lock pointer (more specifically, the difference between the lock and read base positions) effectively controls the allocation and release of FIFO entries, while the busy vector stored in busy register 324 controls the allocation and release of the corresponding allocation units. By allowing a comparison between the read base pointer and the lock pointer (e.g. by allowing determining the difference between the read base pointer and the lock pointer), the lock pointer Lock indicates that FIFO entries up to the lock pointer are free, while FIFO entries following the lock pointer FIFO are in use by data that has not been read yet. To account for the circularity of the FIFO array 320, a control bit may be used to keep track of whether the lock pointer is ahead or behind the read base pointer.

The functioning of buffer controller 302 may be better understood by considering exemplary steps shown in FIG. 6-A-B for write and read operations, respectively, and a sequence of exemplary write and read operations illustrated in FIG. 6-C.

FIG. 6-A shows an exemplary a sequence of steps performed by a video coding system during a reorder buffer write operation according to some embodiments of the present invention. The steps described below may be performed by write control logic 308 (FIG. 5). In a step 400, the size and type of an incoming video data block are determined by parsing the input bitstream. The size and type of the video data block may be identified by metadata associated with the video data block. In a step 402, the number and/or size of allocation units needed to store the incoming video data block are determined. In some embodiments, available allocation unit sizes include 8×8, 16×8, 8×16, 16×16, 32×4, 32×8 and 32×16. Different allocation unit sizes may be used for different data types and/or block size of the incoming data. For example, in some embodiments, an allocation unit size of 8×8 is used for frequency-domain (transform) data, while an allocation unit size of 8×16 or 16×16 is used for pixel-domain data blocks. In some embodiments, multiple blocks may be stored in a given allocation unit, as illustrated by the exemplary block 252 in FIG. 4. In some embodiments, each allocation unit may include the data of only one video block, even if the allocation unit size is larger than the video block size; for example, a 4×4 block is stored alone in an 8×8 allocation unit, with the rest of the allocation unit remaining unused. In a step 404, the needed number of FIFO entries in FIFO array 320 are reserved by incrementing the write next pointer, modulo the size of FIFO array 320 (e.g. modulo 24 in the example of FIG. 5-B). In a step 406, the busy vector 324 is checked to identify available allocation units. In a step 408, pointers to the requisite number of available allocation units are written to corresponding allocation unit pointer fields (UnitID) within the current write span WrFrame, and the associated type and tag fields are updated according to the incoming data. In a step 410, the incoming video data is written to the assigned allocation unit(s) in write order, which may be different from the order in which the data will be read out. During the current write operation, data may be written to any of the allocation units within the current write frame. The busy vector 324 (FIG. 5-B) is updated to reflect the write operation just completed (step 412), and the write base pointer WrBase is updated to take the value of the write next pointer WrNext.

FIG. 6-B shows an exemplary a sequence of steps performed by a video coding system during a reorder buffer read operation according to some embodiments of the present invention. The steps below may be performed by read control logic 310 (FIG. 5-A) in response to a read command received from a processing unit that requests the reorder buffer data. In a step 500, the Type field of the FIFO entry pointed to by the read base pointer RdBase is read in order to determine the amount of data to be read. In a step 502, the read next pointer RdNext is incremented according to the number of allocation units determined from the Type field value to define the current read span RdFrame. During the current read operation, data may be read from any location within the current read frame. The tag fields within the current read span are checked to determine which memory words hold non-zero samples (step 504), and the non-zero data is read from the corresponding allocation units in read order, which may be different from the order in which the data was written (step 506). The read order is determined by read control logic 310 according to the processing to be performed by the requesting unit, and optionally according to the Type field associated with the data. In some embodiments, the read order may be specified dynamically in a read command by the requesting unit. In some embodiments, the read order may be fixed for a given reorder buffer. For example, for a horizontal transform that follows a vertical transform unit, the order is fixed for the reorder buffer between the two transform units, with data read horizontally, line by line. In a step 508, the lock pointer is incremented and the Busy vector 324 (FIG. 5-B) is updated to release each allocation unit and corresponding FIFO entry immediately after the data of the allocation unit has been read completely.

FIG. 6-C illustrates a sequence of write, read, and write operations performed for two 32×32 data blocks in a reorder buffer having 24 FIFO entries each pointing to an 8×8 allocation unit, according to some embodiments of the present invention. In particular, FIG. 6-C shows the state of FIFO array 320 at four times during the sequence. A FIFO array state 600 illustrates allocated (hatched) and free (blank) FIFO entries after a 32×32 block taking up 16 allocation units (0-15) have been written to a previously-empty reorder buffer. If another 32×32 block requests write access to the FIFO array in this state, there is not enough free space to complete the write operation, and the write operation does not proceed. The first data block then starts being read from various locations and allocation units start being released after being read completely, starting with the allocation unit pointed to by FIFO entry 0, and proceeding down sequentially by FIFO entry number. Each allocation unit and corresponding FIFO entry are released when the data of the allocation unit has been read completely. Data may be read out of order within each allocation unit and within the read frame, but allocation units are released in the FIFO order determined by the organization of FIFO array 320. Moreover, the mapping between FIFO entries and allocation units is fully associative, i.e. any free allocation unit within the buffer may be assigned to the next FIFO entry scheduled for a write operation, and in some instances the allocation unit size may be different between FIFO entries. After eight allocation units have been read completely, the eight allocation units and corresponding FIFO entries (0-7) have become free, and the reorder buffer has enough space (16 free allocation units) to fit the incoming second video block, as illustrated by the FIFO array state 602. The data of the second block is then written to the reorder buffer, starting at the allocation unit pointed to by FIFO entry 16, and proceeding down (and wrapping around) to the allocation unit pointed to by FIFO entry 7, with the result illustrated by the FIFO array state 604. The FIFO array state 606 illustrates the result of reading the remaining 8 allocation units of the first data block, which leaves the data of the second video block within the reorder buffer.

The exemplary video reorder buffer systems and methods described above allow achieving a relatively-high reorder buffer utilization, and thus using relatively small reorder buffers, in video encoding and/or decoding systems. The discussion below will focus on exemplary encoding standard implementations and considerations (e.g. block sizes and partitions) for illustrative purposes, though it will be apparent to the skilled artisan that other block sizes and other encoding parameters than the ones discussed below may be used in systems and methods according to embodiments of the present invention.

Systems that process two-dimensional sets of data, like video compression and decompression, video processing, and graphics, generally perform such processing on blocks of data. For the MPEG2 and H.264 compression standards, the largest blocks are 16×16, called macroblocks, and consist either of only one component (for monochrome images for example) or multiple components, 3 in general (YUV, YCbCr, RGB, etc.). The chroma components can be down-sampled (4:2:0 and 4:2:2 for example) or not (4:4:4). In most applications, the number of bits per component sample is 8, but some use fewer, and some more, like 10, 12, and others. The size in number of bytes of a macroblock may vary depending on all these options. For example, a 16×16 YCbCr macroblock with 8-bit 4:2:0 components has a size of 384 bytes; a 16×16 YCbCr macroblock with 16-bit 4:4:4 components has a size of 1,536 bytes.

In general, macroblocks may be partitioned in smaller blocks, such as 16×8, 8×16, 8×8, 8×4, 4×8, 4×4, and the data of the portioned blocks go through a number of processing steps. In particular, the video block data may need to be stored in memory buffers in between the processing steps. Many times the incoming and outgoing sample or block order are different, so intermediate buffers are used for data reordering.

In some pipelined implementations, double buffering may be used under the control of hardware or software using multiple threads or cores. Analysis of buffer fullness in a system employing conventional double buffering has revealed buffer usage that may be below 50%. In certain cases, when there is some correlation between the incoming and outgoing sample or block order, the buffer utilization may be significantly less than 50%. At the same time, double buffering is relatively simple to implement, and its relatively low buffer utilization need not be a primary concern for the limited block sizes of MPEG2 or H.264 systems.

For the upcoming HEVC (High Efficiency Video Coding, H.265) standard, the largest block size, for a block called a coded tree block, is 64×64. Such a block is 16 times larger than the 16×16 macroblock. Quad-tree block decomposition may be used to split the coded tree blocks in coding units. Coding units can be 64×64, 32×32, 16×16, and 8×8. Coding units can use intra or inter prediction. For intra prediction, the coding unit can be predicted as a single unit or can be further split in 2×2 units. For inter prediction, the coding unit can be predicted as a single unit or can be further split in 2 (horizontally or vertically, symmetric or asymmetric) or 2×2 units. For the residual, the coding unit can be further split down to 4×4 blocks. After all splitting is done, the coded tree block may be decomposed in intra prediction units of 64×64, 32×32, 16×16, 8×8, and 4×4; inter prediction units of 64×64, 64×32, 32×64, 64×8, 8×64, 64×48, 48×64, 32×32, 32×16, 16×32, 32×8, 8×32, 32×24, 24×32, 16×16, 16×8, 8×16, 16×4, 4×16, 16×12, 12×16, 8×8, 8×4, and 4×8; and transform units of 32×32, 16×16, 8×8, and 4×4.

A simple double buffering solution would need to be used for the whole 64×64 coded tree block in order to accommodate all decomposition possibilities. The increased buffering requirements would make simple double-buffering relatively costly, particularly since reorder buffering may be used at multiple locations within the encoding/decoding pipeline. In a decoder, reorder buffering may be needed: after frequency coefficients are assembled in 4×4 blocks and before they are sent to the transform unit; between the vertical and horizontal 32×32, 16×16, 8×8, or 4×4 transforms; after the vertical 32×32, 16×16, 8×8, or 4×4 transform and before the addition of the inter prediction; and/or after motion compensation and before the loop filter. An encoder generally includes in its loop a decoder to keep track of the reconstructed samples, so all the above apply to encoders too. In addition, encoders may need data reordering: in the motion estimation unit, if RDO (Rate-Distortion Optimization) is used to select the best candidates for inter prediction; in the intra prediction unit if RDO is used to select the best candidates for intra prediction; after the subtraction of the inter prediction from the input picture and before the forward transform unit; in the forward transform unit if RDO is used to select the best transform size; in between the horizontal and vertical 32×32, 16×16, 8×8, or 4×4 forward transform; and/or after the transform and before frequency coefficients are assembled in 4×4 blocks for a CABAC encoder. In such systems, the buffering needs are no longer insignificant. In addition, the active and static (leakage) power consumption of the larger buffers can become problematic, particularly in mobile devices subject to relatively stringent power constraints.

The generic reorder buffer implementation described above allows minimal buffering to be employed, close to the algorithmic limit. The reorder buffer space needed by the largest unit (coded tree block for HEVC) is partitioned in a number of smaller allocation units, which are then assigned on a need basis to incoming data blocks, and released after the data was used by the downstream processing unit. As a consequence, allocation units are assigned to the incoming data in the order they are released by the outgoing data. This relationship between allocation unit release and assignment orders allows minimizing the buffer size and allows close to, or even 100% buffer utilization, depending on the allocation unit size.

To keep track of how data is stored and read, a FIFO structure is used in parallel to the reorder buffer, as described above. Each FIFO entry stores the allocation unit ID (pointers to memory allocation units) and possibly data type information, like luma/chroma and transform size for example.

The allocation unit size can be chosen depending on the data type, block sizes used, and desired granularity. There is a tradeoff in choosing the allocation unit size. The smaller the allocation unit, the finer the granularity and the closer we get to the algorithmic limit of the buffer size. At the same time, the overhead of the allocation unit FIFO becomes larger. For HEVC, a good tradeoff is 8×8 allocation units for transform data (up to four 4×4 blocks may be then grouped into the same 8×8 allocation unit), and 8×16 or 16×16 for pixel data (multiple 4×4 and/or 8×8 blocks may be then grouped into the same allocation unit). Separate allocation units can be used for luma and chroma when luma and chroma are processed separately. When luma and chroma are processed multiplexed or when luma and chroma blocks are processed sequentially, allocation units can combine luma and chroma samples.

To facilitate a better understanding of a number of practical considerations, the following description will focus on an exemplary implementation of transform reorder buffering. In particular, the description below will exemplify how allocation units controlled as described above can be used to reorder frequency coefficients decoded as 4×4 blocks that use the diagonal-up, horizontal, or vertical order and are sent to the transform unit in column order for the 32×32, 16×16, 8×8, or 4×4 transform.

Consider an allocation unit size of 8×8 samples. If a sample is a 16-bit two's complement frequency coefficient, an allocation unit has 128 bytes. The buffer word size in this case may be 16 bits (the size of a sample), but other word sizes (e.g. 8 bits, 9 bits) may be used in other processing blocks. For an exemplary pipeline throughput of 4 samples per cycle, an allocation unit can be partitioned into 16×64 (bit) or 8×2 (sample) locations of 4 samples arranged vertically, each 16 bits wide. Such an allocation unit can hold four 4×4 blocks for the 4×4 transform or one 8×8 block for the 8×8 transform, as illustrated by blocks 252 and 254 in FIG. 4. Also as shown in FIG. 4, 16×16 blocks use 4 allocation units arranged as 2×2 (see video block 256 in FIGS. 4), and 32×32 blocks use 16 allocation units arranged as 4×4 (see video block 258 in FIG. 4). In such a system, 24 allocation units are needed to support a stall-free pipeline operation, for a 4:2:0 chroma format in which an N×N luma block is followed by a N/2×N/2 Cb, then Cr block. The total buffer size in such a system is 1,536 samples (3 Kbytes, organized as 384×64), which may be half of a corresponding double buffer solution.

Consider now an exemplary write operation. When the first 4×4 block of a new 4×4 or 8×8 transform unit is parsed from the bitstream, one FIFO entry is reserved and the WrNext pointer is set to WrBase+1, modulo 24. When the first 4×4 block of a new 16×16 or 32×32 transform unit is parsed from the bitstream, 4 (16 for 32×32) allocation units are reserved and the WrNext pointer is set to WrBase+4 (16 for 32×32), modulo 24. The FIFO entries starting with WrBase and ending with the one before WrNext modulo 24 constitute the WrFrame where the incoming samples are stored. The Type of the FIFO entry pointed by WrBase is loaded with the transform type, then allocation units are assigned on a need basis. The Busy vector is checked for an available allocation unit (e.g. the available allocation unit with the lowest index), whose ID is stored to the FIFO's entry UnitID. UnitID will be used whenever samples are stored to the memory. When non-zero samples are written to the memory, the appropriate Tag bit in the allocation unit FIFO entry is set. After all non-zero samples have been stored, WrBase takes the value of WrNext.

Consider now an exemplary read operation. After a whole transform unit or a sufficient number of samples have been written to the memory, the read process checks the Type of the FIFO entry pointed by RdBase. Based on the determined type, an appropriate value of RdNext is set to mark the RdFrame. The read process checks the Tag to find out which memory words hold non-zero samples and starts reading columns from right to left, but only those words with at least one non-zero sample. Once eight columns have been read, one FIFO entry is released for the 4×4 and 8×8 transforms (two for 16×16 and four for 32×32) by incrementing the Lock pointer (FIFO entries become available for future transform blocks) and allocation units are released by clearing the corresponding bits in the Busy vector (memory allocation units become available to be assigned to future samples).

For the 16×16 and 32×32 transforms, the mapping of allocation units shown in FIG. 4 may allow early release of FIFO entries during a read process as described above. Consider for example a reorder buffer situated after the CABAC engine that decodes the frequency coefficients from the bitstream and before a first transform that works vertically (see FIG. 2-A). Consider also frequency coefficients encoded in the bitstream in 4×4 blocks, with the 4×4 blocks in various orders. For example, for the larger transforms (16×16 and 32×32), the 4×4 blocks may be ordered in a bottom-up order, diagonally-up starting from the bottom right corner. As the blocks are written to the reorder buffer, the non-zero coefficients are populated in the allocated memory, which may be 16 allocation units for each 32×32 block. The columns that have all 0 coefficients are not written, but are marked in the FIFO by clearing the corresponding Tag bit.

The allocated reorder buffer space will then fill up generally diagonally, starting from the bottom-right corner of the 32×32 block. Once the last column on the right is available (all non-zero coefficients have been written and the Tag bits have been set accordingly), the read control logic will start reading data for the vertical transform unit following the reorder buffer. If a column has all Tag bits cleared, the vertical transform is skipped as all coefficients are 0. When all 8 right-most columns are done, either by doing the vertical transform or skipping it because of 0 only coefficients, allocation units 0 to 3 can be released because they are no longer needed. Allocation units 4 to 15 are still in use and are protected by the Lock pointer. Allocation units 0 to 4 are not read in the same cycle, so in case they are read top to bottom, allocation unit 0 can be released first, then 1, 2, and at the end allocation unit 3.

Another example of the applicability of the disclosed reorder buffer is to reconcile or align the sample order coming from the transform (4×4, 8×8, 16×16, or 32×32) with the inter prediction data (anything from 64×64 down to 8×4 and 4×8–4×4 for H.264). Intra prediction does not need this reordering, as it can be computed in the same order as the transform data. The reorder buffer may be used for the transform samples, as it provides buffering to mask the latency of the inter prediction data may be read from external memory. Consider an allocation unit size of 8×8 samples, and a buffer using 32 allocation units for luma and another 32 for chroma. Such a buffer may be sufficient if there is a correlation between the transform and inter prediction data. For a pipeline throughput of 4 samples per cycle, the memory width may be ×36 bits for 8-bit samples (one extra bit used for the transform output). Such a system may use a reorder memory of 64 allocation units of 16×36 (8×72 if a single port memory is used, when read and write alternate), for a total size of 4.5 Kbytes, organized as a dual port 1024×36 or single port 512×72 SRAM. This buffer size may be one third of a comparable double buffering solution, which may require storing 12K 9-bit samples. In such an example, the allocation FIFO entries may use only the UnitID fields described above, so the FIFO overhead is reduced.

The above embodiments may be altered in many ways without departing from the scope of the invention. Accordingly, the scope of the invention should be determined by the following claims and their legal equivalents.

What is claimed is:

1. An integrated circuit comprising:
   a video data reorder buffer including a plurality of allocation units, wherein a particular allocation unit of the plurality of allocation units is configured to store information indicative of an array of video data;
   a plurality of registers, wherein a particular register of the plurality of registers is configured to store information indicative of a pointer to a corresponding allocation unit of the plurality of allocation units and an identifier indicating if corresponding video data is chroma data;
   control logic configured to:
   determine a size of an incoming video data block based upon metadata associated with the incoming video data block, wherein the size specifies dimensions of a two-dimensional array of video data;
   determine a number of allocation units for storing the incoming video data block based upon the size and in response to a determination that the incoming video data block is frequency-domain data;
   select one or more allocation units of the plurality of allocation units based upon the determined number of allocation units;
   store a pointer value specifying a given allocation unit of the one or more allocation units in a corresponding register of the plurality of registers; and
   store the incoming video data block into the one or more allocation units.

2. The integrated circuit of claim 1, wherein the integrated circuit further comprises a video encoder, and wherein the video data reorder buffer forms part of the video encoder.

3. The integrated circuit of claim 1, wherein the integrated circuit further comprises a video decoder, and wherein the video data reorder buffer forms part of the video decoder.

4. The integrated circuit of claim 1, wherein the video data reorder buffer forms part of a quantization unit of a video coder.

5. The integrated circuit of claim 1, wherein the video data reorder buffer forms part of a motion compensation or motion estimation unit of a video coder.

6. The integrated circuit of claim 1, wherein the video data reorder buffer forms part of a loop filter of a video coder.

7. The integrated circuit of claim 1, wherein the video data reorder buffer forms part of a prediction determination unit of a video coder.

8. The integrated circuit of claim 7, wherein the control logic is further configured to retrieve data from at least one allocation unit using a read base pointer pointing to a FIFO entry identifying a next allocation unit for a read operation.

9. The integrated circuit of claim 1, wherein the size of the incoming video data block is 8×8.

10. The integrated circuit of claim 1, wherein the size of the incoming video data block is 8×16, and wherein the control logic is further configured to determine a number of allocation units for storing the incoming video data block based upon the size and in response to a determination that the incoming video data block is pixel-domain data.

11. The integrated circuit of claim 10, wherein the particular allocation unit is further configured to store a portion of the incoming video data block.

12. The integrated circuit of claim 1, wherein the incoming video data block is included in motion compensation data.

13. The integrated circuit of claim 1, wherein the control logic is further configured to assign allocation units to incoming video data in an order that allocation units are released by outgoing video data.

14. The integrated circuit of claim 1, wherein the particular register of the plurality of registers is further configured to store second information indicative of a type field indicating at least one parameter for video data stored in an allocation unit corresponding to the pointer stored in the particular register, wherein the at least one parameter includes one of a second identifier of an intra or inter type of video data.

15. The integrated circuit of claim 1, wherein the particular register of the plurality of registers is further configured to store second information indicative of a tag field including a bitmap indicating a set of memory words containing non-zero samples in an allocation unit corresponding to the pointer stored in the particular register.

16. The integrated circuit of claim 1, wherein the plurality of registers is organized as a circular array.

17. The integrated circuit of claim 1, wherein to store the incoming video data block, the control logic is further configured to identify a next allocation unit using a write base pointer.

18. The integrated circuit of claim 1, further comprising a busy register configured to store a busy vector indicating which allocation units of the plurality of allocation units are full.

19. The integrated circuit of claim 1, wherein the particular allocation unit is further configured to store information indicating the incoming video data block is chroma data.

20. A video coding method comprising:
determining, by control logic, a size of an incoming video data block based upon metadata associated with the incoming video data block, wherein the size specifies dimensions of a two-dimensional array of video data;
determining, by the control logic, a number of allocation units for storing the incoming video data block based upon the size and in response to determining that the incoming video data block is frequency-domain data;
selecting, by the control logic, one or more allocation units of a plurality of allocation units included in a video data reorder buffer based upon the determined number of allocation units;
storing, by the control logic, a pointer value specifying a given allocation unit of the one or more allocation units in a corresponding register of a plurality of registers;
storing, by the given allocation unit, an identifier indicating if corresponding video data is chroma data in the corresponding register of the plurality of registers; and
storing the incoming video data block into the one or more allocation units.

21. The video coding method of claim 20, wherein the video data reorder buffer is included in a video encoder.

22. The video coding method of claim 20, wherein the video data reorder buffer is included in a video decoder.

23. The video coding method of claim 20, wherein the video data reorder buffer forms part of a quantization unit of a video coder.

24. The video coding method of claim 20, wherein the video data reorder buffer forms part of a motion compensation or motion estimation unit of a video coder.

25. The video coding method of claim 20, wherein the size of the incoming video data block is 8×8.

26. The video coding method of claim 20, wherein the size of the incoming video data block is 8×16, and further comprising determining, by the control logic, a number of allocation units for storing the incoming video data block based upon the size and in response to determining that the incoming video data block is pixel-domain data.

\* \* \* \* \*